June 16, 1942.  C. P. FULLER  2,286,613
LIQUID SUPPLY SYSTEM
Filed June 8, 1939  2 Sheets-Sheet 1
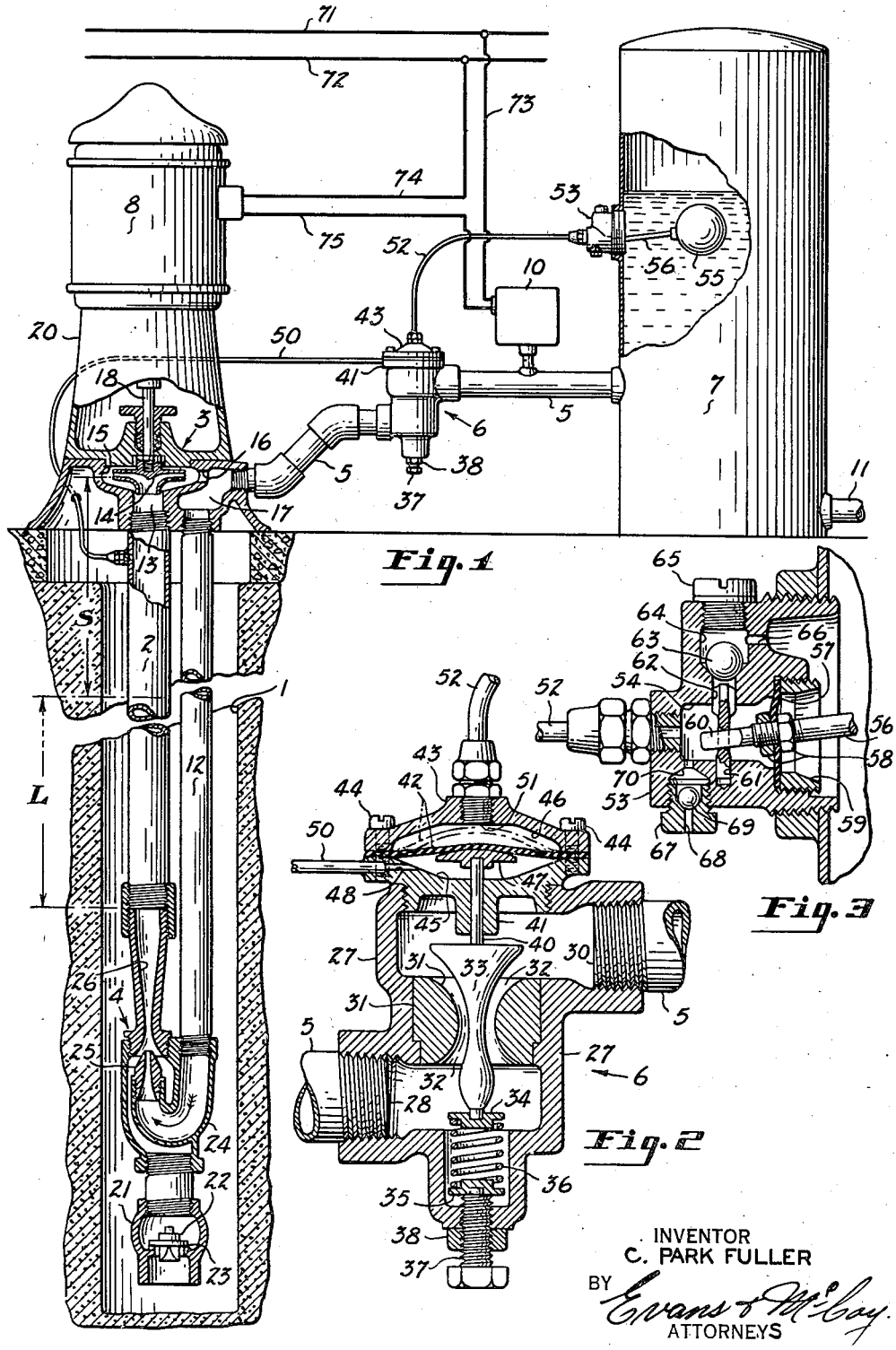
INVENTOR
C. PARK FULLER
BY Evans & McCoy
ATTORNEYS June 16, 1942. C. P. FULLER 2,286,613
LIQUID SUPPLY SYSTEM
Filed June 8, 1939 2 Sheets-Sheet 2
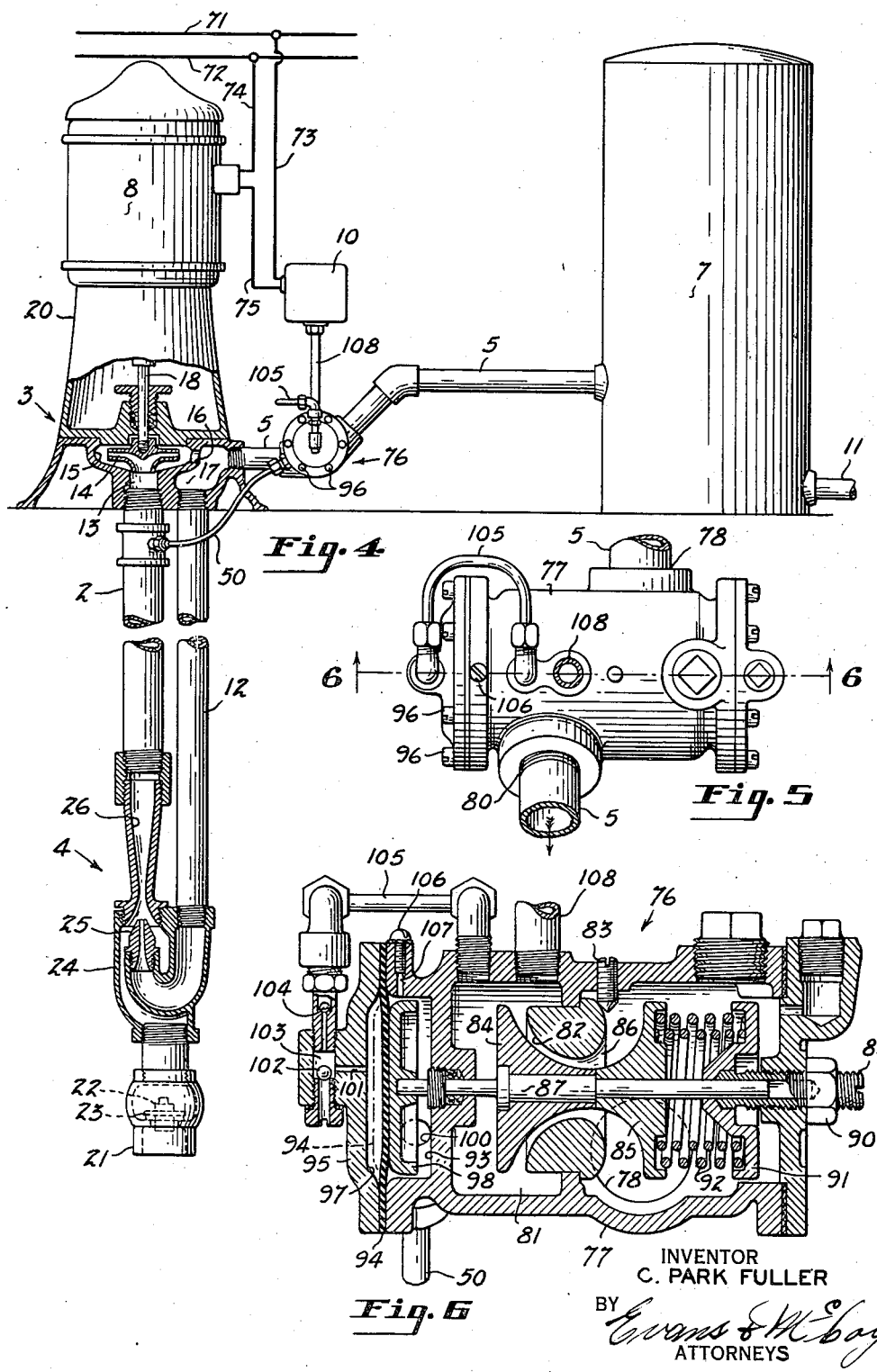
INVENTOR
C. PARK FULLER
BY Evans & M^c Coy
ATTORNEYS Patented June 16, 1942

2,286,613

UNITED STATES PATENT OFFICE 2,286,613

LIQUID SUPPLY SYSTEM

Chauncey Park Fuller, Berkeley, Calif., assignor, by mesne assignments, to Pomona Pump Company, Pomona, Calif., a corporation of Delaware Application June 8, 1939, Serial No. 278,065

10 Claims. (Cl. 103—6)

This invention relates to liquid supply systems and in particular to supply systems used to provide water under pressure for factory, domestic or other desired purposes.

It is an object of the present invention to provide a water supply system which will be automatically controlled to insure that an adequate supply of water will be available at the tank outlet at all times.

Another object is to provide a water supply system using an injector circuit to increase the lift of the pump with a control means to minimize the danger of the system breaking prime due to the location of the source of water at a distance below the pump greater than the suction lift ability of the pump.

Another object is to provide a water supply system which will not lose its prime during relatively long periods of non-use.

A further object is to provide a water system using an injector circuit, in which the addition of air into the storage tank may be regulated by the amount of air already present in the tank.

A still further object is to provide a water system, having an injector circuit, with a control means whereby the pump may be operated at an efficient capacity without danger of the pump losing its prime during operation.

Another object is to provide a water system using an injector circuit in which the proportion of water recirculated through the injector circuit is determined by the vacuum in the intake passage of the pump.

Other objects and advantages of the present invention will become apparent from the following detailed description accompanied by the drawings, in which:

Figure 1 is an elevational view of a system embodying the invention with parts broken away and partly in section;

Fig. 2 is a fragmentary enlarged sectional view of a control valve used in the system shown in Fig. 1 and disposed between the pump and the storage tank;

Fig. 3 is a fragmentary enlarged sectional view of the air control mechanism disposed on the storage tank of the system shown in Fig. 1;

Fig. 4 is an elevational view with parts broken away and partly in section, illustrating a modified form of system embodying the invention;

Fig. 5 is an enlarged plan view of a control valve used in the system shown in Fig. 4 and disposed between the pump and the storage tank; and Fig. 6 is a sectional view taken substantially on the line 6—6 of Fig. 5.

In the accompanying drawings, in which like parts throughout the several views are indicated by the same reference numerals, two modified forms of water supply systems are shown. Figs. 1 to 3, inclusive, illustrate an embodiment of the invention in which the amount of additional air supplied to the storage tank is regulated by the amount of air already present in the tank. Figs. 4 to 6, inclusive, show a modified form of water supply system in which a predetermined approximately correct amount of air is injected into the storage tank periodically, upon starting of the pump.

Briefly, the water system shown in Fig. 1 comprises a well or suitable water supply 1, an intake line 2 leading to a suitable pump 3 and having therein a suitable jet or injector mechanism indicated generally by the numeral 4, a discharge line 5 from the pump conducting the water from the pump through a control valve indicated generally by the numeral 6, to a suitable storage tank 7. The pump 3 may be driven by any suitable means such as a motor 8 and the current used to energize the motor may be passed through a suitable pressure responsive switch 10, as will be explained in detail later. Water may be withdrawn from the outlet 11 of the storage tank 7.

The control valve 6 serves the purpose of controlling the amount of water discharged directly from the pump to the storage tank, causing certain of the water from the pump to pass back to the intake line 2 through a conduit 12 which is known in the art as a drive line. Water passing through the drive line is forced upwardly through the injector mechanism 4 and aids in inducing additional water upwardly through the intake line.

The pump 3 is shown in the drawings as a rotary centrifugal pump having an intake passage 13 registering with the intake line 2 to draw water from the intake line into the central axial portions of a swiftly moving impeller 14 which by centrifugal force throws the water into an annular pressure channel 15. The water travels in a rotary motion in the pressure channel until it reaches an outlet passage 16 which opens into a chamber 17, the chamber 17 registering with discharge line 5 and also with the drive line 12. The impeller 14 is mounted on one end of a drive shaft 18 which is suitably journaled in a casing or frame 20 which also supports the motor 8. The details of the particular pump used are not highly important, any suitable pump which will perform the necessary operations being suitable for the present invention.

Below the point in the intake line 2 at which the drive line 12 is connected, the intake line is provided with what is known in the art as a foot valve 21, which comprises a valve body 22 which rises from its seat 23 when the water pressure outside the intake line is greater than the pressure in the intake line.

The injector mechanism may be of any suitable type but preferably comprises an annular casing 24 connected to the intake line and having an internal jet 25 which is connected to the drive line 12. The jet 25 is spaced from the interior walls of the casing 24 so that water may pass through the jet as well as around the sides thereof. Secured to the casing 24 and having its inlet disposed in the region of the jet orifice is a Venturi nozzle 26 which is wholly disposed within the intake line 2. Water passing through the drive line 12 enters the jet 25 where its velocity is materially increased and its pressure correspondingly decreased. Water from the jet passes directly into the Venturi nozzle and due to the action of the jet and venturi, additional water is induced through the foot valve 21 of the casing 24 and is drawn into the venturi and up the intake line for an appreciable distance.

In operation water from the impeller 14 enters the pressure chamber 17 where it divides between the discharge line 5 and the drive line 12. Water from the drive line 12 discharging from the jet 25 at high velocity creates a partial vacuum in the region at the entrance to the Venturi nozzle 26, whereby water in the casing 24 drawn through the foot valve 21 enters the Venturi nozzle. The velocity energy of the combined stream is then converted into pressure energy in the Venturi tube. When water is supplied through the drive line 12 at a specified pressure, it will develop at the exit end of the Venturi tube a pressure sufficient to lift the combined stream through a height L to a point in the intake line 2 at a vertical distance S below the pump impeller. If the distance S is not greater than the suction lift ability of the pump, operation of the pump is continuous and the quantity of water entering the foot valve 21 is delivered to the storage tank 7 through the discharge line 5. However, if the pressure in the region of the chamber 17 and the discharge line 5, decreases to such a value that the pressure in the drive line 12 is insufficient to raise water in the intake line 2 to such a height L that the distance S is within the suction lift of the pump, then the pump will break prime and operation will cease. To maintain the amount of water passing into the drive line sufficient to keep the pump in operation, the control valve 6 is provided.

Details of the control valve 6 may best be seen in Fig. 2. The control valve 6 comprises a casing 27 provided with an inlet passage 28 communicating with the discharge line 5 from the pump and provided with an outlet passage 30 which discharges into a continuation of the discharge line 5 connected to the interior of the storage tank 7. Between the inlet passage 28 and the outlet passage 30, a valve seat 31 is disposed, having a central opening 32 therethrough. Disposed concentrically within the opening 32 is a valve body 33, one end of which is located in a recess of a spring retaining washer 34 and mounted below the washer 34 and opposed thereto, is an identical washer 35, between which washers a coil spring 36 is retained. Within the recess of the washer 35 a projection of a bolt 37 is located, said bolt being threadedly mounted in an aperture of the casing. A lock nut 38 is also threadedly mounted on the bolt 37 so that the position of the bolt 37 with respect to the casing 27 may be maintained. The top portion of the valve body 33 terminates in a cylindrical stem 40 which extends through and is journaled in a member 41 threadedly mounted in the casing 27. The top surface of the member 41 may be slightly concave and is provided with a circumferential flat surface upon which a flexible diaphragm 42 may be mounted, such diaphragm being held over the concave portion of the member 41 by a member 43 similar in shape to the member 41 but disposed in opposite relation thereto. The flat surfaces of the members 43 and 41 may be secured together by suitable bolts 44. This construction provides chambers 45 and 46, respectively, disposed on each side of the diaphragm 42. The chamber 45 is enclosed by the diaphragm and the concave surface of the member 41 and the stem 40 of the valve body extends thereinto, with a head portion 47 secured to the stem. On the other side of the diaphragm is the chamber 46 enclosed by the diaphragm and the concave surfaces of the member 43. An aperture 48 is formed in the member 41 and opens into the chamber 45, connecting the chamber with a tube 50, the other end of which is secured onto the wall of the intake line 2 and opening into the intake line in the region of the intake passage 13 of the pump 3.

In this manner, when the pump is started into operation, a high vacuum impulse is created in the intake line in the region of the intake passage 13 of the pump and this high vacuum impulse is transmitted through the tube 50 to the chamber 45, causing a lowering of the flexible diaphragm 42 (looking at Fig. 2). When the system is at rest the diaphragm 42 lies against the concave surface of the member 43 as shown in dotted outline in Fig. 2 and downward movement of the diaphragm causes the stem 40 to move in a downward direction, thereby compressing the coil spring 36. As the stem 40 and the valve body 33 are moved in a downward direction the size of the opening 32 through the valve seat 31 decreases, restricting the flow of water therethrough. This builds up the pressure in the intake passage 28 of the casing 27 and the increased pressure is transmitted to the chamber 17, thereby forcing a large proportion of the water discharged by the pump into the drive line 12. As the proportion of water passing through the drive line 12 is increased, the amount of water induced through the Venturi tube is also increased, thus causing an increase in the pressure, that is, a decrease in the vacuum in the intake line 2 which, being transmitted through the tube 50, may allow the diaphragm 42 to rise slightly. During the operation of the pump the diaphragm 42 may fluctuate in accordance with the pressures in the system, but upon stopping of the pump the system will come to rest and the diaphragm 42 will move to the position shown in dotted outline in Fig. 2 against the concave surface of the member 43 thereby causing a material reduction in the volume of the chamber 46.

The chamber 46 in the member 43 communicates through an aperture 51 in the member 43 with an air line 52 which is secured to the air injector mechanism disposed on the storage tank 7, as shown in Fig. 1. The details of the air injection mechanism are shown in Fig. 3, where it may be seen that such mechanism comprises a body 53 having a central recess 54. The storage tank 7 is provided with a float 55 connected to one end of a float lever 56, the other end of which extends into the recess 54. The recess 54 is separated from the interior of the storage tank by a flexible wall 57. The float lever 56 extends through the wall 57 and is held to the wall by a pair of nuts 58 threadedly mounted on the float lever, one on each side of the wall 57. The wall 57 is retained across the mouth of the recess 54 to seal the same by a hollow collar 59 threaded into the body 53. The end of the lever 56 passes through an aperture disposed intermediate the ends of a small stem or pin 60 slidably mounted in recesses of the body 53.

As shown in Fig. 3, the lower end of the stem 60 is adapted to slide in a guide recess 61 disposed in the wall of the central recess 54 in the body 53. The upper end of the member 60 is fluted and is mounted in a guide recess 62 in the wall of the central recess 54 opposite the guide recess 61. The guide recess 62 opens through the body 53 and is counterbored to provide a seat for a ball 63, said counterbored portion being indicated by the numeral 64 and being closed by a set screw 65 threaded into the body 53. Opening from the counterbored portion 64 is a relatively small aperture 66 extending through the body 53 and communicating with the interior of the storage tank 7.

Thus, when the water level of the storage tank is such that the float 55 raises the float lever to approximately the position shown in Fig. 3, the stem 60 is in its lower position out of contact with the ball 63 so that the ball 63 seats and closes the opening between the counterbored portion 64 and the guide recess 62 and forms a check valve whereby communication between the sealed recess 54 and the interior of the storage tank 7 may only be had in the direction from the recess 54 into the storage tank and not from the storage tank to the recess. When the level in the storage tank 7 falls and the float 55 pivots the float lever 56 about the flexible wall 57, the stem 60 will be raised by the float lever and will raise the ball 64 from its seat providing communication between the recess 54 and the storage tank 7 in either direction for a purpose to be described later.

A hollow bushing 67 having a central aperture or bore 68 therethrough and a ball valve member 69 disposed in a counterbored portion of the aperture 68 is threadedly mounted in an aperture 70 which extends through a wall of the body 53 and opens into the recess 54. Thus, the bushing 67 provides a check valve permitting air to enter the recess 54 but not allowing egression of air therefrom.

In a water system in which an amount of air is impounded above the water in the storage tank for the purpose of creating pressure, the main difficulty encountered is to insure that an adequate supply of air is present above the water. If insufficient air is present the withdrawal of a relatively small amount of water from the storage tank will rapidly lower the pressure in the tank and to obtain more pressure the pump must be started at very frequent intervals. If, on the other hand, the amount of air above water in the storage tank is too great, there is a possibility that when water is being withdrawn a steady stream will not be available due to air bubbling through the pipes leading from the storage tank.

Furthermore, if the system is at rest for an appreciable period of time, a portion of the air above the water is absorbed into the water, which of course decreases the amount of air above the water. It is, therefore, desirable to inject air into the storage tank when the air supply is low.

In the operation of the automatic air injection system such as is used in the embodiment of the present, shown in Figs. 1 to 3, inclusive, the air injection system is mounted in the region of the desired water level to be maintained in the tank by providing the float 55 and the float lever 56. Additional air may be injected into the tank according to the dictates of the float and float lever.

To facilitate this automatic air injection the pressure responsive switch 10 is provided. This switch may be of any suitable construction as is well known in the art and usually comprises a pressure responsive element, which, being in communication with the pressure in the storage tank, serves to start the operation of the pump when the pressure in the tank falls below a certain predetermined value and stops the operation of the pump when the pressure in the tank increases above a certain predetermined value. If desired, the switch may be made so that its pressure limits may be adjusted.

The hook-up for switch 10 is diagrammatically shown in Fig. 1. A suitable source of current is indicated by the wires 71 and 72, respectively. A wire 73 is connected to the wire 71 and also to one contact of the switch 10. The wire 72 is connected by a wire 73 to one terminal of the motor 8. The other contact of the switch 10 is connected by a suitable wire 75 to the other terminal of the motor 8.

As water is withdrawn from the storage tank 7, the pressure in the tank falls below the predetermined amount and the switch 10 causes the motor to start the pump in operation, and, as previously mentioned, a high vacuum impulse created in the intake line is transmitted through the tube 50 to the chamber 45, the diaphragm 42 is moved downwardly (viewing Fig. 2), and the chamber 46 is expanded in volume, creating a partial vacuum therein.

If at the time the partial vacuum is created in the chamber 46 the water level in the tank 7 is sufficiently low so that there is an ample amount of air in the storage tank, the float 55 has moved downwardly from the position shown in Figs. 1 and 3, has caused the float lever 57 to pivot about the flexible wall 57 and raise the stem 60, thereby unseating the ball 63 so that the air in the storage tank may pass through the aperture 66, the counterbored portion 64, into the recess 54, and through the air line 52 to the chamber 46, to compensate for the partial vacuum.

However, if at the time the partial vacuum is created in the chamber 46 the water level in the storage tank 7 is above the proper level, that is, the amount of air in the storage tank is insufficient, the float 55 will be raised to the position shown in Figs. 1 and 3 and communication from the storage tank to the recess 54 is prevented by the seating of the ball 63 on its seat in the counterbored portion 64. Therefore, there will also be a partial vacuum in the recess 54 and atmospheric pressure will force air through the bore 68 of the hollow bushing 67 and will raise the ball 69 from its seat in the counterbored portion of the bore 68 of the bushing 67 to compensate for the vacuum. When the diaphragm 42 returns to its position against the member 43, the volume of the chamber 46 is contracted and the additional air which enters through the check valve in the bushing 67 will be forced past the fluted portions of the stem 60 into the counterbored portions 64 and through the small aperture 66 and will join the body of air above the water in the tank.

Thus it may be seen that the air injection mechanism is compensating in its effect, that is, when there is an insufficient amount of air in the storage tank, air will be injected into the storage tank each time the pump is started, and no air will be pumped into the storage tank so long as there is sufficient air contained therein. This effect is cumulative due to the fact that with an insufficient amount of air in the storage tank the pump will operate more often because the pressure in the tank drops more rapidly when the water is withdrawn from the tank.

It is to be noted that the design of the control valve, indicated generally by the numeral 6, is very advantageous in many respects. The valve body 33 is curved in such a manner as to reduce shock on the system due to closing and opening of the valve body 33, and it is also to be noted that the valve seat 31 and the opening therethrough is curved somewhat complementary to the valve body 33, so that the valve body and valve seat cooperate to form, in effect, a divergent tube which tends to convert the velocity energy of the water passed therethrough into pressure energy.

Furthermore, it may be seen that the valve body 33 is forced away from its valve seat 31 by spring 36 so that the valve opening is wide open during periods when the pump is at rest. This allows sufficient water to pass back into the pump and jet lines to replace any water that might be lost through leakage of the foot valve 7 or the packing gland around the pump shaft, thereby preventing the system from losing its prime during periods of non-use.

In the embodiment of the present invention shown in Figs. 4, 5, and 6, the major portion of the water system is substantially the same. In this embodiment a modified form of control valve, indicated generally by the numeral 76, is used, and a different air injection system is also used which does not require the injection mechanism shown in detail in Fig. 3.

Briefly, the air injection mechanism shown in the system illustrated by Figs. 4 to 6, inclusive, operates to inject a predetermined amount of air into the water line leading to the storage tank each time the pump is started and stopped. This device is so constructed that an approximately correct amount of air is injected into the storage tank, and it has been found that such a system will be highly satisfactory unless, of course, it is operated under extreme or abnormal usages.

The control valve 76 has a main body or casing 77 into which one end of the discharge pipe 5 from the pump is connected, as indicated at 78. The discharge line 5 from the control valve 76 to the tank 7 is connected into the casing as indicated at 80 in Fig. 5. On the interior of the casing a central chamber 81 communicates with the ends of the discharge pipe 5 leading from the pump and to the storage tank. Disposed in the chamber 81 and subdividing it into two portions is a valve seat member 82 held in place by a set screw 83. Two cooperative members 84 and 85, respectively, make up the valve body and both of these members are mounted on a suitable stem 87 and disposed in an opening 86 through the valve seat member 82. One end of the stem 87 is received in the central aperture of a hollow screw 88 threadedly engaged by the wall of the casing 77 and adapted to be secured by a lock nut 90. The circumferential portions of the inner end of the screw 88 are received in a recessed portion of a collar 91 which is freely mounted on the stem 87. One or more suitable coil springs 92 may be disposed between two opposed circumferential recesses in the valve body 85 and collar 91, respectively.

The other end of the stem 87 is journaled in a wall of the casing 77 extending therethrough and terminating in a chamber 93. The chamber 93 is defined by the concave surface of one end of the casing 77 and is surrounded by circumferential flange portions which terminate in relatively flat surfaces, upon which a flexible diaphragm 94 may be mounted. The diaphragm may be held against the circumferential flat portions and across the chamber 93 by a concave member 95 having similar circumferentially extending flat-surfaced portions. The member 95 may be bolted to the end of the casing 77 by suitable stud bolts 96 which extend through the adjacent flat surfaced circumferential flanges of the member 95 and the casing 77, and when the member 95 is so mounted on the casing 77 the concave surfaces thereof form a chamber 97 closed by the flexible diaphragm 94. An enlarged head 98 is carried by the end of the stem 87 within the chamber 93 so that the stem may contact the diaphragm 94 throughout a relatively large area.

As in the construction of the control valve shown in Fig. 2, the tube 50, which is connected to the intake line 2 at one end, has its other end connected to and in communication with the chamber 93 by means of the aperture 100. Disposed in a wall of the member 95 and in communication with the chamber 97 is an aperture 101 which connects the chamber 97 with a double check valve construction shown in Fig. 6. In Fig. 6 the lower check valve, indicated by the numeral 102, may only transmit air into a passage 103 which is open to the chamber 97 through the aperture 101. The other check valve 104 is constructed so that it can only transmit air from the passage 103 through an air line 105 to the chamber 81 in the interior of the casing 77 in a region adjacent the outlet thereof.

The operation of the control valve 76 is quite similar to the operation of the control valve 6, it being substantially as follows: When the pump 3 is started into operation, a high vacuum impulse created in the intake line is transmitted through the tube 50 and the aperture 100 to the chamber 93 and moves the flexible diaphragm 94 from its dotted line position shown in Fig. 6 to its full line position, thereby causing the enlarged head 98 to move the stem 87 towards the right and restrict the opening 86 between the valve body 84 and the valve seat member 82. The movement of the flexible diaphragm 94 causes an expansion in the volume of the chamber 97, reducing the air pressure therein so that air is forced through the check valve 102 into the passage 103. While the pump is operating, the valve body 84 and the stem 87 fluctuate in an axial direction but eventually reach an equilibrium position which may be approximately that shown in full lines in Fig. 6. However, when the pump is turned off and the system comes to rest, the action of the spring 92 moves the stem 87 to the left, causing the diaphragm 94 to assume the position shown in dotted outline in Fig. 6, that is, against the concave surface of the member 95, thereby decreasing the volume of the chamber 97 and forcing the air in the passage 103 through the check valve 104 and the line 105 into the chamber 81, where the air may pass through the discharge line 5 to the storage tank 7. If desired, a bleeder screw 106 may be disposed in the wall of the casing 77 to close an aperture 107 communicating with the chamber 93, so that any air bubbles which may accumulate in the chamber 93 can be exhausted therefrom to assure proper movement of the stem 87.

In the embodiment of the invention shown in Figs. 4, 5, and 6, the pressure responsive switch 10 is shown connected to the casing 77 of the control valve 76 and in communication with the chamber 81 thereof by a suitable line 108. Of course, its operation is substantially the same as though it were located in the discharge line 5 as shown in Fig. 1.

It may readily be seen that control valves embodying the present invention may be made and operated without the additional feature of an air injection mechanism which is shown in the drawings. For example, the control valve may be used in a water supply system having a storage tank which supplies water to taps by gravity. In such a case the function of the control valve is to direct a sufficient amount of water down the drive line to insure that the height L through which the injector lifts water is at a distance S from the pump impeller, the distance S being within the suction lift ability of the pump, so that the pump will not lose its prime during operation thereof.

It is to be understood that variations and modifications of the specific devices herein shown and described for purposes of illustration, may be made without departing from the spirit of this invention.

What I claim is:

1. In a water pressure system having a tank, a pump, an intake passage and a discharge line for said pump, an injector in the intake passage of said pump, a line communicating from the discharge line of said pump to the jet of said injector, means for operating said pump when the pressure in said tank falls below a predetermined value, and valve means disposed in said discharge line between the line to the injector and the tank actuatable by vacuum in the intake passage in proximity to the pump to automatically determine the proportional amounts of water flowing through the discharge line and the line to the injector.

2. Liquid supply apparatus which comprises a storage tank, a pump to supply liquid to said tank, an intake passage for conducting liquid to said pump, a discharge passage for conducting liquid from said pump to said tank, an injector disposed in said intake passage, a conduit communicating with said discharge passage and the injector, a valve seat in the discharge passage, a valve body adjacent the valve seat, an opening through the valve seat, and means operable by the vacuum in the region of the intake passage upon starting the pump to cause the valve body to restrict the opening through the valve seat and decrease the amount of liquid flowing to the tank whereby the amount of liquid flowing through the conduit to the injector is increased.

3. Liquid supply apparatus which comprises a storage tank, a pump to supply liquid to said tank, an intake passage for conducting liquid to said pump, a discharge passage for conducting liquid from said pump to said tank, an injector disposed in said intake passage, a conduit communicating with said discharge passage and the injector, a valve seat in the discharge passage, a valve body adjacent the valve seat, an opening through the valve seat, a chamber in communication with the intake passage of the pump, an end portion of the valve body disposed in said chamber, and means whereby the vacuum created in the intake passage upon starting the pump will actuate the valve body to restrict the valve opening and increase the flow of liquid to the injector.

4. Liquid supply apparatus which comprises a storage tank, a pump to supply liquid to said tank, an intake passage for conducting liquid to said pump, a discharge passage for conducting liquid from said pump to said tank, an injector disposed in said intake passage, a conduit communicating with said discharge passage and the injector, a valve seat in the discharge passage, a valve body adjacent the valve seat, an opening through the valve seat, a chamber, an end portion of the valve body disposed in the chamber, a flexible diaphragm member disposed adjacent the end portion of the valve body and dividing the chamber, said portion of the chamber containing the end portion of the valve body being in communication with the intake passage of the pump, and means connected to the other portion of the chamber to permit entrance of air into the chamber and exit of air from the chamber into the discharge line to the storage tank.

5. Liquid supply apparatus which comprises a storage tank, a pump to supply liquid to said tank, an intake passage for conducting liquid to said pump, a discharge passage for conducting liquid from said pump to said tank, an injector disposed in said intake passage, a conduit communicating with said discharge passage and the injector, a valve seat in the discharge passage, a valve body adjacent the valve seat, an opening through the valve seat, a chamber, an end portion of the valve body disposed in the chamber, a flexible diaphragm member disposed adjacent the end portion of the valve body and dividing the chamber, said portion of the chamber containing end portion of the valve body being in communication with the intake passage of the pump, and means connected to the other portion of the chamber to permit entrance of air into the chamber and exit of air from the chamber into the storage tank.

6. Liquid supply apparatus which comprises a pump to supply liquid, an intake passage for conducting liquid to said pump, a discharge passage for conducting liquid from said pump, an injector disposed in said intake passage, a conduit communicating with said discharge passage and the injector, and means utilizing the vacuum in that portion of the intake passage which is in proximity to the pump for automatically proportioning the liquid flow from the discharge passage and to the injector.

7. Liquid supply apparatus which comprises a storage tank adapted to contain liquid and air under pressure, a pump, an intake line and a discharge line for said pump, an injector in the intake line of said pump, a line communicating from the discharge line of said pump to the jet of said injector, means for operating said pump when the pressure in said tank falls below a predetermined value, valve means actuatable by vacuum in the intake line disposed in said discharge line between the line to the injector and the tank to control the amount of water flowing through the discharge line and the line to the injector, and means associated with and actuated by said valve means to cause passage of air into said tank.

8. Liquid supply apparatus which comprises a storage tank adapted to contain liquid and air under pressure, a pump to supply liquid to said tank, an intake line and a discharge line for said pump, an injector in the intake line of said pump, a line communicating from the discharge line of said pump to the jet of said injector, means for operating said pump when the pressure in said tank falls below a predetermined value, valve means actuatable by the vacuum in that portion of the intake passage which is in proximity to the pump to control the proportional amounts of water flowing through the discharge line and the line to the injector, and means associated with and actuated by said valve means for causing passage of a predetermined amount of air into said tank upon starting and stopping of said pump.

9. Liquid supply apparatus which comprises a pump to supply liquid, an intake passage for conducting liquid to said pump, a discharge passage for conducting liquid from said pump, an injector disposed in said intake passage, a conduit communicating with said discharge passage and the jet of said injector, and a valve actuatable by the vacuum in that portion of the intake passage which is in proximity to the pump for controlling the amount of liquid flowing to said injector.

10. Liquid supply apparatus which comprises a storage tank, a pump to supply liquid to said tank, an intake passage for conducting liquid to said pump, a discharge passage for conducting liquid from said pump to said tank, a chamber disposed on the discharge side of said pump and leading to said discharge passage, an injector disposed in said intake passage, a passage in communication with said chamber and said injector, means for starting and stopping said pump as determined by conditions in said tank, and valve means actuatable by vacuum in said intake passage for automatically controlling the proportional amounts of liquid passing from said chamber to said passage and discharge passage.

CHAUNCEY PARK FULLER.